United States Patent [19]

Factor et al.

[11] Patent Number: 5,006,450
[45] Date of Patent: Apr. 9, 1991

[54] MORDANT POLYMER PHOTOGRAPHIC ELEMENT CONTAINING

[75] Inventors: Ronda E. Factor, Rochester; Ignazio S. Ponticello, Pittsford, N.Y.

[73] Assignee: Eastman Kodak Company, Rochester, N.Y.

[21] Appl. No.: 437,003

[22] Filed: Nov. 15, 1989

[51] Int. Cl.$^5$ .................................................. G03C 1/06
[52] U.S. Cl. .................................... 430/518; 430/510; 430/523; 430/537; 526/263; 526/293.3; 526/292.9
[58] Field of Search ............... 430/518, 510, 523, 536, 430/537; 526/263, 292.3, 292.9

[56] References Cited

U.S. PATENT DOCUMENTS

| | | | |
|---|---|---|---|
| 1,939,171 | 12/1933 | Hickman | 95/9 |
| 1,994,876 | 3/1935 | Schneider et al. | 95/9 |
| 2,036,546 | 4/1936 | Schnieder | 95/81 |
| 3,748,129 | 7/1923 | Avtges et al. | 96/3 |
| 4,379,838 | 4/1983 | Helling et al. | 430/578 |

FOREIGN PATENT DOCUMENTS 127787  12/1984  European Pat. Off. .

*Primary Examiner*—Jack P. Brammer
*Attorney, Agent, or Firm*—Paul A. Leipold

[57] ABSTRACT

Polymers comprising repeating units having the structure:

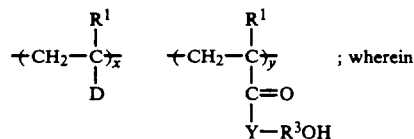

where $R^1$, $R^3$, D, Y, x, and y are as defined herein are useful for controlling wandering of filter dyes in photographic elements.

6 Claims, No Drawings

MORDANT POLYMER PHOTOGRAPHIC ELEMENT CONTAINING

FIELD OF THE INVENTION

This invention relates to mordant polymers and the use thereof in photographic elements.

BACKGROUND OF THE INVENTION

Filter dyes in photographic elements may be in various locations in an element. They may be in a radiation-sensitive layer, in an overcoat layer, in a layer adjacent to the radiation-sensitive layer, in an interlayer in a multilayer element, in an undercoat layer adjacent to the support or in a backing layer on the side of the support opposite the radiation-sensitive layer.

Filter dyes that function primarily to absorb unwanted radiation due to reflection or refraction from layer interfaces, the layer-support interface, and particularly from the back side of the support, are referred to as antihalation dyes. The layers that contain them are referred to as antihalation layers.

It is usually important that the filter dyes in photographic elements not wander from the layer in which they are incorporated, during or after coating. It is also almost always important that the dye be easily and completely bleached or otherwise removed from the element during processing, and not be regenerated. This requirement is important since residual dye in the coating is a source of objectionable stain.

The problem of dye stain is exacerbated by trends in the photographic industry to systems with very short processing times. Shortened processing times in, for example, x-ray and microfilm processing systems, necessitate shortened wash times, which mean less time for dye removal.

Mordants are often used to prevent filter dyes from wandering to other layers. Mordants, however, work against the aim of shortening processing times and elimination of dye stain. Therefore, mordants that prevent wandering but effectively release the dye during processing are highly desirable.

SUMMARY OF THE INVENTION

The present invention provides polymers which are useful in controlling dye wandering in silver halide photographic elements. The polymers may be used with gelatin. They are permeable to alkaline solutions thereby permitting dyes to be rapidly and completely removed or decolorized during photographic processing.

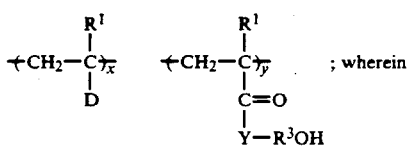

D represents a substituted or unsubstituted heterocyclic group containing an amine acid addition salt component, or D may represent:

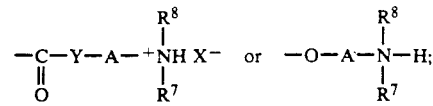

$R^1$ represents —H or —CH$_3$;
$R^3$ represents alkylene of 2 to 6 carbon atoms;
Y represents O or NH;
x represents 10 to 100 weight percent; and
y represents 0 to 90 weight percent.

$R^7$ and $R^8$ each independently represents H, alkyl of 1 to 20 carbons, cycloalkyl of 3 to 8 carbons, aryl of 6 to 20 carbons, or aralkyl of 6 to 20 carbon atoms; or $R^7$ or $R^8$ taken together with A represent the elements needed to complete a five or six membered ring;
Y represents O or NH;
A represents a divalent radical of 1 to 20 carbon atoms.

DESCRIPTION OF THE PREFERRED EMBODIMENTS

The polymers are particularly useful in films subjected to short machine processing times, such as x-ray films and microfilm materials, where the dyes must be easily and rapidly removed during processing and where any dye retention is undesirable.

DETAILS OF THE INVENTION

The polymers of this invention should be miscible with gelatin and may be used either as a component of a filter dye containing layer or as a separate layer, between a filter dye-containing layer and a light-sensitive emulsion layer. When in a separate layer from the dye containing layer, the polymer forms a matrix which controls dye wandering.

Upon processing, the polymers, being permeable to alkaline solutions, permit easy access of the processing solution to the selected filter dyes. For example, the copolymer poly(2-aminoethyl methacrylate hyrochloride-co-2-hydroethyl methacrylate) deprotonates in alkaline solution and no longer binds the dye. The dyes thus released in alkaline solutions are easily removed and/or decolorized.

The polymers must comprise at least 10 weight percent of repeating units derived from monomers which will protonate at coating pH (about 6) but which deprotonate at processing pH (10–12). This requirement insures that the polymers of the invention will be permeable to alkaline solutions having a pH of 10 or above. Monomers which respond to these requirements are aminoalkyl acrylate or aminoalkylacrylamides and monomers derived from vinyl pyridinium and vinyl imidazolium salts or other vinyl heteronitrogen onium salts. Representative monomers are illustrated generally by structures I to VII below. The invention is not limited to these, however.

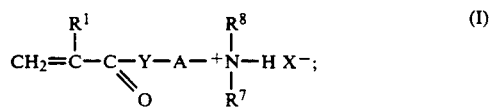

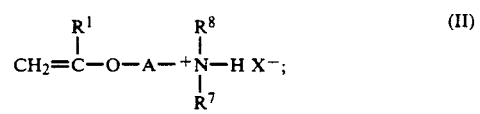

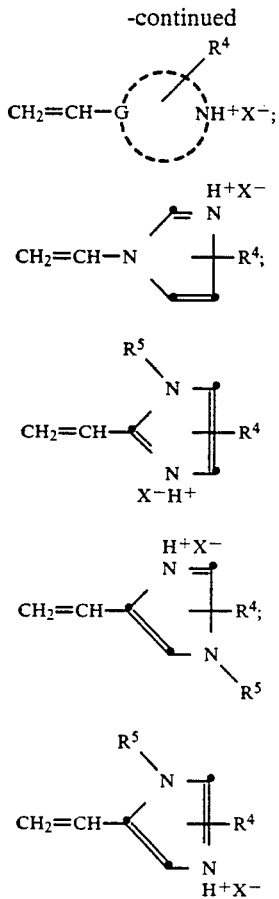

R¹ represents H or methyl;

R⁷ and R⁸, each independently, represents H, alkyl of 1 to 20 carbons, cycloalkyl of 3 to 8 carbons, aryl, of 6 to 20 carbons or aralkyl of 6 to 20 carbon atoms; or R⁷ or R⁸ taken together with A represent the elements needed to complete a five or six membered ring;

R⁴ represents H, alkyl of 1 to 20 carbons atoms, cycloalkyl of 3 to 8 carbon atoms, aryl of 6 to 20 carbon atoms, or aralkyl; and R⁵ represents alkylene or hydroxyalkylene of 2 to 6 carbon atoms and G represents the elements needed to complete an pyridine ring;

Y represents O or NH;

A represents a divalent radical of 1 to 20 carbon atoms; and

X represents Cl⁻, Br⁻,

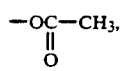

NO⁻₃, HSO₄⁻, or ClO₄⁻.

Monomeric examples of structure I include 2-aminoethyl methacrylate HCl 3-aminopropylmethacrylamide HCl, etc.

Monomeric examples of structure II include 2-aminoethyl vinyl ether, 2-aminoethylstrylether, etc.

Monomeric examples of structure III include 4-vinylpyridine; 2-vinylpyridine, 2-methyl 5-vinylpyridine, etc.

Monomeric examples of structure IV include N-vinyl imidazole, 2-methyl-N-vinylimidazole, 2-phenyl-N-vinylamidazole, etc.

Monomeric examples of structure V include N-alkyl-2-vinylimidazoles wherein alkyl is ethyl, methyl, propyl, butyl, etc.

Monomeric examples of structure VI include N-alkyl-4-vinylimidazole wherein alkyl is ethyl, methyl, propyl, butyl, etc.

Monomeric examples of structure VII include N-alkyl-5-vinylimidazole wherein alkyl is ethyl, methyl, propyl, butyl, etc.

The polymers of the invention can include 0.0 to 90 weight percent of recurring units derived from polymers having the structure

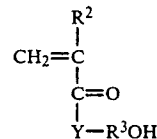

wherein Y, R² and R³ are as previously designated.

Examples of monomers of the structure include 2-hydroxyethyl methacrylate, 2-hydroxyethyl acrylate, 2-hydroxypropyl acrylate, 2-hydroxypropyl methacrylate, N-(2-hydroxyethyl)methacrylamide, N-(2-hydroxyethyl)acrylamide, and N-(2-hydroxypropyl)methacrylamide.

When present, recurring units derived from these monomers provide the polymer with hydrophilicity and swellability.

The exact composition of the polymers used will vary according to the element into which they are to be incorporated, the nature of the processing conditions, and the dye(s) used. The optimum ratio of components can be determined by one skilled in the art of polymers and film building. The molecular weight of the polymers is preferably between $1 \times 10^4$ and $5 \times 10^6$, as determined by the light-scattering method.

The polymers are prepared by a method exemplified by example 1.

The polymers of the invention are useful in photographic filter dye layers or in interlayers for controlling unwanted migration of soluble filter dyes in photographic elements. Such dyes include acidic mono-, tri-, and pentamethine oxonols, merocyanines (carbo and dicarbo), tetrazines, and barbituric acids. Examples of soluble dyes requiring mordants to prevent unwanted migration are known in the art, as described, for example, in U.S. Pat. No. 3,795,519, the disclosure of which is incorporated herein by reference.

EXAMPLE 1

POLY(2-AMINOETHYL METHACRYLATE HYDROCHLORIDE-CO-2-HYDROXYETHYL METHACRYLATE) (70/30)

To a solution of 2-aminoethyl methacrylate hydrochloride (140.0 g, 0.85 moles) and 2-hydroxyethyl methacrylate (60.0 g, 0.46 moles) in water and ethanol (200 ml, 1.8:1.0) under a nitrogen atmosphere was added 2,2′-azobis[2-methylpropionitrile] (3.0g) as initiator. The solution was heated at 60°–65° C. in a thermostat water bath for 6.0 hours and then stirred at room temperature overnight. The polymer solution was purified by diafiltration (10 passes) with a 20,000 molecular weight cut off polysulfone membrane to give a solution of 6.4% solids. Yield 85%. The following polymers were prepared in the same manner.

Representative polymers of the invention that are presented in Table I were prepared using the same method.

TABLE I

Polymer Weight Ratio

Poly(2-aminoethyl methacrylate hydrochloride-co-2-hydroxyethyl methacrylate) (50/50)

Poly(2-aminoethyl methacrylate hydrochloride-co-2-hydroxyethyl methacrylate) (40/60)

Poly(2-aminoethyl methacrylate hydrochloride-co-2-hydroxyethyl methacrylate) (30/70)

Poly(2-aminoethyl methacrylate hydrochloride-co-2-hydroxyethyl methacrylate) (20/80)

Poly(2-aminoethyl methacrylate hydrochloride-co-2-hydroxyethyl methacrylate) (10/90)

The invention is further illustrated by the following examples. Yellow filter dyes used in the examples are identified by structures 1 and 2 below.

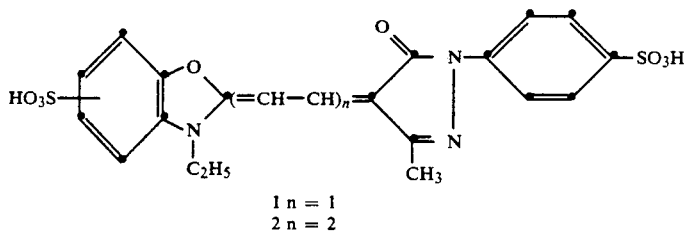

1 n = 1
2 n = 2

EXAMPLE 2

Evaluation of a Polymer-gelatin Layer Containing Dyes 1 and 2 as Filter Dyes as an Antihalation Undercoat Layer The polymer of example 1 having varying monomer weight ratios were used in this example.

Each coating referred to in the example was prepared by conventional means on a polyester terephthalate support in an aqueous base therein.

Nine different coatings were prepared in this example. Their respective compositions are presented in Table II.

TABLE II

| Coating No. | Polymer x | Polymer y | Polymer g/m² | Gelatin (g/m²) | Dye 1 (g/m²) | Dye 2 (g/m²) |
|---|---|---|---|---|---|---|
| 1 | 0 | 0 | 0 | 2.7 | 0.11 | 0.00 |
| 2 | 0 | 0 | 0 | 2.7 | 0.00 | 0.11 |
| 3 | 40 | 60 | 1.1 | 1.6 | 0.11 | 0.00 |
| 4 | 70 | 30 | 1.1 | 106 | 0.11 | 0.00 |
| 5 | 40 | 60 | 1.1 | 1.6 | 0.00 | 0.11 |
| 6 | 70 | 30 | 1.1 | 1.6 | 0.00 | 0.11 |
| 7 | 20 | 80 | 0.5 | 1.1 | 0.11 | 0.00 |
| 8 | 50 | 50 | 0.3 | 1.1 | 0.11 | 0.00 |
| 9 | 100 | 0 | 0.3 | 1.1 | 0.11 | 0.00 |

The absorption maximum and optical density of each coating was determined in a spectrophotometer before any processing. A sample of each coating was then given a distilled water wash for five minutes and dried. The optical density of the coating was determined again. Two other samples of each coating were subjected to photographic processing. One was subjected to the conditions of photographic processing in the Kodak Prostar® processor. The second was similarly subjected to the conditions of the Kodak X-omat® Processor. The optical density of the dye in each of the processed coating strips was determined again.

Gelatin-Only Coatings

Dye 1 in Coating 1 has an absorption maximum at 441 nm and an OD of 0.92. After the distilled water wash, the dye was completely removed from the Coating 1. After processing in either of the processors there was no absorption at all, which was not surprising since the dye was completely removed with just a water wash. In Coating 2, Dye 2 has an absorption maximum at 522 nm with an OD of 1.00. After processing Dye 2 was completely removed.

Gelatin-Polymer Coatings

Coating 3 contained the polymer of Table II in which x was 40 and y was 60. Coating 4 contained the polymer wherein x was 70 and y was 30. In all four of these coatings the presence of the polymer completely immobilized the dye during the distilled water wash. However, upon processing the dyes were as completely removed as were the dyes in the pure gelatin vehicle. Table III indicates the optical density of coatings 7, 8 and 9, along with the optical density after a distilled water wash for five minutes and the optical density after processing in the Kodak Prostar® Processor.

TABLE III

| Coating No. | Initial Optical Density | Optical Density After 5' Wash | Optical Density After Prostar ® Processing |
|---|---|---|---|
| 7 | 0.95 | 0.90 | 0.03 |
| 8 | 0.94 | 0.93 | 0.03 |
| 9 | 0.83 | 0.87 | 0.03 |

Thus, the polymers of the invention effectively prevent diffusion of dyes in a layer. Yet the dyes are quickly removed during photographic processing.

EXAMPLE 3

Evaluation of Polymers as Diffusion Control Layer

As stated herein before, the polymers of the invention are also useful as diffusion control layers. This example illustrates the use of the polymers of the invention in this manner.

Two layers were prepared in a manner similar to that used for the single layer coatings of Example 1. The coating provided for gelatin coverage of 1.6 gm/m², a dye level of 0.11 gm/m², a surfactant level of 0.081 gm/m² and a hardener level of 0.016 gm/m². The coatings were overcoated with a polymer composition featuring one of the polymers used in Example 1 to achieve polymer coverage of 1.1 gm/m², surfactant level of 0.086 gm/m² and hardener level of 0.011 gm/m². In one set of coatings the dye in the layer was Dye 1. In another, the dye was Dye 2.

The chart below shows the diffusion control layer and the dye of the associated AHU layer.

| Diffusion Control Coating No. | g/m² Polymer in Diffusion Control Layer | | g/m² Dye in Diffusion Control Layer | |
|---|---|---|---|---|
| | x = 40; y = 60 | x = 70; y = 30 | Dye 1 | Dye 2 |
| 1 | 1.1 | 0.0 | 0.11 | 0.0 |
| 2 | 0.0 | 1.1 | 0.0 | 0.11 |

Dye absorption (OD) was plotted vs wavelength as in Example 1. Strips of the coatings were given the distilled water wash as in Example 1. No change in the absorption curves was observed. Other coating strips were subjected to the processing conditions of the Kodak Prostar® processor. Following this treatment, the strips showed a complete absence of dye.

EXAMPLE 4

Monochrome, incorporated coupler, photographic elements were prepared by coating the following layers on a film support in the order shown:

Layer 4 Protective overcoat layer comprising gelatin (4.3 g/m²)
Layer 3 Magenta layer comprising gelatin (2.7 g/m²), 1-(2,4,6-trichlorophenyl)-3-(3-(α-(2,4-di-t-amyl-phenoxy)-acetamido)benzamido)-5-pyrazolone (1.5 g/m²), tricresyl phosphate (0.75 g/m²), Green-sensitized AgBrI (1.3 g/m²)
Layer 2 Filter dye layer comprising composition described below
Layer 1 Gelatin layer comprising gelatin (4.9 g/m²)
Cellulose Acetate Film Support The filter dye layer contained 0.16 g/m² of yellow filter dye structure 1, 0.40 g/m² of a polymer of this invention consisting of 50 percent 2-aminoethyl methacrylate hydrochloride copolymer and 50 percent 2-hydroxyethyl methacrylate copolymer and 1.1 g/m² of gel. The control filter dye layer comprised 0.16 g/m² of yellow filter dye structure 1, 0.19 g/m² of the polymer of U.S. Pat. No. 2,382,156 referred to on page 2 of the specification and 1.1 g/m² of gelatin. A polydisperse, 3.4 mole percent iodide, silver bromoiodide emulsion was used. Samples of each element were sensitometrically exposed through a wratten filter no. 98 for blue exposure and a wratten filter no. 99 for green exposure. A standard E-6 reversal and a rehalo process was used, with three minutes used for the first developer and six minutes for the second developer.

Unwanted migration of yellow filter dye into the emulsion layer would be reflected in blue speed losses, while unwanted interaction of the polymer with sensitizing dye would result in green speed losses. Results indicated rehalo blue speeds for the polymer of this invention at least as great as the control coating. Green speeds were within 0.03 Log E for the coating containing the polymer of this invention relative to the coating containing the control polymer. These results indicate no unwanted wandering of yellow dye during coating for the polymer of this invention relative to the control polymer. These results also indicate no unwanted emulsion interaction of the polymer of this invention relative to the control polymer.

The spectral distribution of the yellow filter dye, structure 1, with the polymer of this invention, is within two nanometers on the longer wavelength side of the control polymer. This result indicates the appropriate filtering characteristics for the yellow filter dye in combination with the polymer of this invention.

The photographic elements in which the mordant polymer of this invention are useful are black and white, single color, and multicolor photographic elements in which filter layers are used. The polymer is preferably present in an amount of about 0.3 to 10 g/m².

Multicolor elements contain dye image-forming units sensitive to each of the three primary regions of the spectrum. Each unit can be comprised of a single emulsion layer or of multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer, e.g., as by the use of microvessels as described in Whitmore U.S. Pat. No. 4,362,806, issued Dec. 7, 1982.

A typical multicolor photographic element would comprise a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler and a yellow dye image-forming unit comprising at least one blue-sensitive silver halide emulsion layer having associated therewith at least one yellow dye-forming coupler. The element can contain additional layers, filter layers, interlayers, overcoat layers, subbing layers, and the like.

In the following discussion of suitable materials for use in the emulsions and elements of this invention, reference will be made to *Research Disclosure*, December, 1978, Item 17643, published by Kenneth Mason Publications, Ltd., The Old Harbourmaster's, 8 North Street, Emsworth, Hampshire P010 7DD, ENGLAND, the disclosures of which are incorporated herein by reference. This publication will be identified hereafter by the term "*Research Disclosure*".

The silver halide emulsions employed can be either negative-working or positive-working. Suitable emulsions and their preparation are described in *Research Disclosure* Sections I and II and the publications cited therein. Suitable vehicles for the emulsion layers and other layers are described in *Research Disclosure* Section IX and the publications cited therein.

In addition to the couplers the elements can include additional couplers as described in *Research Disclosure* Section VII, paragraphs D, E, F and G and the publications cited therein. These couplers can be incorporated in the elements and emulsions as described in *Research Disclosure* Section VII, paragraph C and the publications cited therein.

The photographic elements or individual layers thereof, can contain brighteners (see *Research Disclosure* Section V), antifoggants and stabilizers (see *Research Disclosure* Section VI), antistain agents and image dye stabilizer (see *Research Disclosure* Section VII, paragraphs I and J), light absorbing and scattering materials (see *Research Disclosure* Section VIII), hardeners (see *Research Disclosure* Section XI), plasticizers and lubricants (see *Research Disclosure* Section XII), antistatic agents (see *Research Disclosure* Section XIII), matting agents (see *Research Disclosure* Section XVI) and development modifiers (see *Research Disclosure* Section XXI).

The photographic elements can be coated on a variety of supports as described in *Research Disclosure* Section XVII and the references described therein.

Photographic elements can be exposed to actinic radiation, typically in the visible region of the spectrum, to form a latent image as described in *Research Disclosure* Section XVIII and then processed to form a visible dye image as described in *Research Disclosure* Section XIX. Processing to form a visible dye image includes the step of contacting the element with a color developing agent to reduce developable silver halide and oxidize the color developing agent. Oxidized color developing agent in turn reacts with the coupler to yield a dye.

The invention has been described in detail with particular reference to preferred embodiments thereof, but it will be understood that variations and modifications can be effected within the spirit and scope of the invention.

We claim:

1. A photographic element comprising a support, a silver halide emulsion layer, and a layer comprising a water-soluble dye and a polymer comprising polymerized recurring units according to the structures:

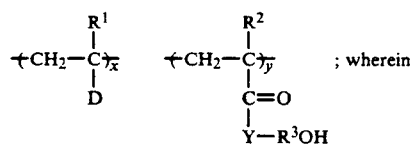

D represents a substituted or unsubstituted heterocyclic group containing an amine acid addition salt component or

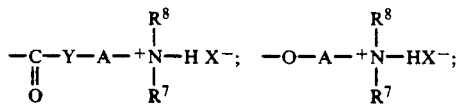

$R^7$ and $R^8$, each independently, represents H, alkyl of 1 to 20 carbons, cycloalkyl of 3 to 8 carbons, aryl, of 6 to 20 carbons or aralkyl of 6 to 20 carbon atoms; or $R^8$ or $R^7$ taken together with A represent the elements needed to complete a five or six membered ring;

Y represents NH;

A represents a divalent radical of 1 to 20 carbon atoms; $R^1$ and $R^2$, each independently represents —H or —CH$_3$;

$R^3$ represents alkylene of 2 to 6 carbon atoms;

x represents 10 to 100 weight percent; and y represents 0 to 90 weight percent;

X represents Cl$^-$, Br$^-$,

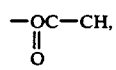

NO$_3^-$, HSO$_4^-$, or ClO$_4^-$.

2. A photographic element according to claim 1 wherein D represents

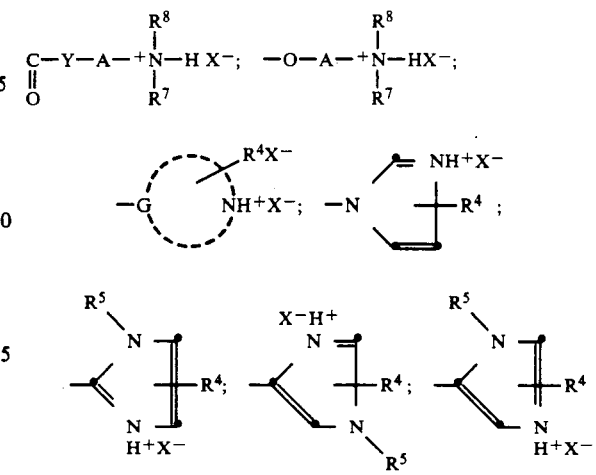

$R^7$ and $R^8$, each independently, represents H, alkyl of 1 to 20 carbons, cycloalkyl of 3 to 8 carbons, aryl, of 6 to 20 carbons or aralkyl of 6 to 20 carbon atoms, or $R^7$ or $R^8$ taken together with A represent the elements needed to complete a five or six membered ring;

$R^4$ represents H, alkyl of 1 to 20 carbons atoms, cycloalkyl of 3 to 8 carbon atoms, aryl of 6 to 20 carbon atoms, or aralkyl; and $R^5$ represents alkylene or hydroxyalkylene of 2 to 6 carbon atoms and G represents the elements needed to complete an pyridine ring;

Y represents NH;

A represents a divalent radical of 1 to 20 carbon atoms; and

X represents Cl$^-$, Br$^-$,

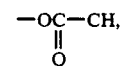

NO$^-_3$, HSO$^-_4$, or ClO$^-_4$.

3. A photographic element according to claim 1 wherein the polymer is poly and wherein x is 20 to 100 weight percent and y is 0 to 80 weight percent.

4. A photographic element comprising a support, a silver halide emulsion layer, a layer comprising a water-soluble dye and a separate layer, between the silver halide layer and the dye layer, comprising a polymer having polymerized recurring units according to the structures:

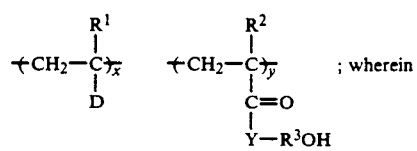

D represents a substituted or unsubstituted heterocyclic group containing an amine acid addition salt component or

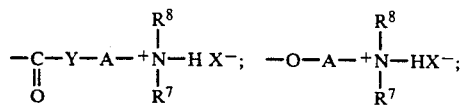

$R^7$ and $R^8$, each independently, represents H, alkyl of 1 to 20 carbons, cycloalkyl of 3 to 8 carbons, aryl, of 6 to 20 carbons or aralkyl of 6 to 20 carbon atoms; or $R^8$ or $R^7$ taken together with A represent the elements needed to complete a five or six membered ring;

Y represents O or NH;

A represents a divalent radical of 1 to 20 carbon atoms; $R^1$ and $R^2$, each independently represents —H or —$CH_3$;

$R^3$ represents alkylene of 2 to 6 carbon atoms;

x represents 10 to 100 weight percent; and y represents 0 to 90 weight percent;

X=Cl⁻, Br⁻,

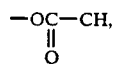

$NO_3^-$, $HSO_4^-$, or $ClO_4^-$.

5. A photographic element according to claim 4 wherein D represents

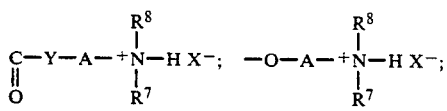

-continued

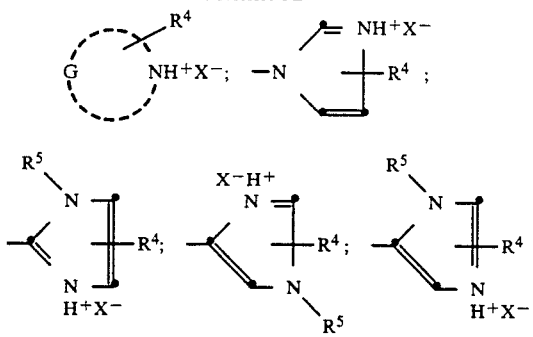

$R^7$ and $R^8$, each independently, represents H, alkyl of 1 to 20 carbons, cycloalkyl of 3 to 8 carbons, aryl, of 6 to 20 carbons or aralkyl of 6 to 20 carbon atoms, or $R^7$ or $R^8$ taken together with A represent the elements needed to complete a five or six membered ring;

$R^4$ represents H, alkyl of 1 to 20 carbons atoms, cycloalkyl of 3 to 8 carbon atoms, aryl of 6 to 20 carbon atoms, or aralkyl; and $R^5$ represents alkylene or hydroxyalkylene of 2 to 6 carbon atoms and G represents the elements needed to complete an pyridine ring;

Y represents O or NH;

A represents a divalent radical of 1 to 20 carbon atoms; and

X represents Cl⁻, Br⁻,

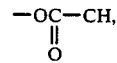

$NO^-_3$, $HSO^-_4$, or $ClO^-_4$.

6. A photographic element according to claim 4 wherein the polymer is poly and wherein x is 20 to 100 weight percent and y is 0 to 80 weight percent.

* * * * *